(12) United States Patent
Tanaka

(10) Patent No.: US 9,715,299 B2
(45) Date of Patent: Jul. 25, 2017

(54) LIQUID CRYSTAL DISPLAY DEVICE

(71) Applicant: Japan Display Inc., Tokyo (JP)

(72) Inventor: Toshihiko Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/875,964

(22) Filed: Oct. 6, 2015

(65) Prior Publication Data

US 2016/0103358 A1    Apr. 14, 2016

(30) Foreign Application Priority Data

Oct. 9, 2014   (JP) .................................. 2014-207862

(51) Int. Cl.
*G06F 3/041*   (2006.01)
*G06F 3/044*   (2006.01)
*G02F 1/1333*  (2006.01)

(52) U.S. Cl.
CPC ............ *G06F 3/0412* (2013.01); *G06F 3/044* (2013.01); *G06F 3/0416* (2013.01); *G02F 1/133382* (2013.01); *G06F 2203/04103* (2013.01)

(58) Field of Classification Search
CPC ...... G06F 3/0412; G06F 3/044; G06F 3/0416; G06F 2203/04103; G02F 1/133382
See application file for complete search history.

(56) References Cited

U.S. PATENT DOCUMENTS

| | | | |
|---|---|---|---|
| 8,488,096 | B2 | 7/2013 | Aoki |
| 2008/0088574 | A1* | 4/2008 | Tsujii ..................... G09G 3/342 345/102 |
| 2008/0246903 | A1* | 10/2008 | Park ....................... G01K 13/00 349/72 |
| 2010/0033654 | A1 | 2/2010 | Aoki |
| 2012/0176569 | A1 | 7/2012 | Aoki |
| 2015/0002459 | A1* | 1/2015 | Watanabe ............. G06F 3/0418 345/174 |

FOREIGN PATENT DOCUMENTS

JP          4623161         2/2011

* cited by examiner

*Primary Examiner* — Paisley L Arendt
*Assistant Examiner* — Mariam Qureshi
(74) *Attorney, Agent, or Firm* — K&L Gates LLP

(57) ABSTRACT

According to an aspect, a liquid crystal display device includes: a liquid crystal display unit that displays an image; a plurality of electrodes arranged in the liquid crystal display unit in parallel with one direction along a display surface of the liquid crystal display unit; a measuring unit that measures electric resistance values of the electrodes; a specifying unit that specifies a temperature of the liquid crystal display unit based on the electric resistance values of the electrodes; and an application unit that applies, to the electrodes, a voltage for causing the electrode to generate heat based on the temperature of the liquid crystal display unit.

5 Claims, 16 Drawing Sheets

LIQUID CRYSTAL DISPLAY DEVICE

CROSS REFERENCES TO RELATED APPLICATIONS

The present application claims priority to Japanese Priority Patent Application JP 2014-207862 filed in the Japan Patent Office on Oct. 9, 2014, the entire content of which is hereby incorporated by reference.

BACKGROUND

1. Technical Field

The present invention relates to a liquid crystal display device.

2. Description of the Related Art

In liquid crystal display devices, response characteristics in operation vary depending on temperatures. Specifically, when the temperature of liquid crystals is low, a response speed decreases. Due to this, known is a temperature control system that heats the liquid crystal display device with a heater depending on a temperature detected by a temperature detector for detecting the temperature around the liquid crystal display device (for example, refer to Japanese Patent No. 4623161).

However, the temperature detector disclosed in Japanese Patent No. 4623161 is arranged outside a display panel of the liquid crystal display device. Thus, the position of the temperature detector is too far from the liquid crystals in the display panel, so that accuracy is insufficient in a configuration for measuring the temperature of a device including the liquid crystals. In the temperature control system disclosed in Japanese Patent No. 4623161, the temperature detector and the heater are individually provided. Accordingly, spaces in which the temperature detector and the heater are respectively arranged are required, which increases a size of a product. The increase in size of the product restricts a design of the product.

For the foregoing reasons, there is a need for a liquid crystal display device that can measure the temperature of a configuration containing the liquid crystals with higher accuracy, and there is a need for a liquid crystal display device that includes both of a configuration for measuring the temperature and a configuration for heating and is downsized.

SUMMARY

According to an aspect, a liquid crystal display device includes: a liquid crystal display unit that displays an image; a plurality of electrodes arranged in the liquid crystal display unit in parallel with one direction along a display surface of the liquid crystal display unit; a measuring unit that measures electric resistance values of the electrodes; a specifying unit that specifies a temperature of the liquid crystal display unit based on the electric resistance values of the electrodes; and an application unit that applies, to the electrodes, a voltage for causing the electrode to generate heat based on the temperature of the liquid crystal display unit.

Additional features and advantages are described herein, and will be apparent from the following Detailed Description and the figures.

DETAILED DESCRIPTION

Figure 1:
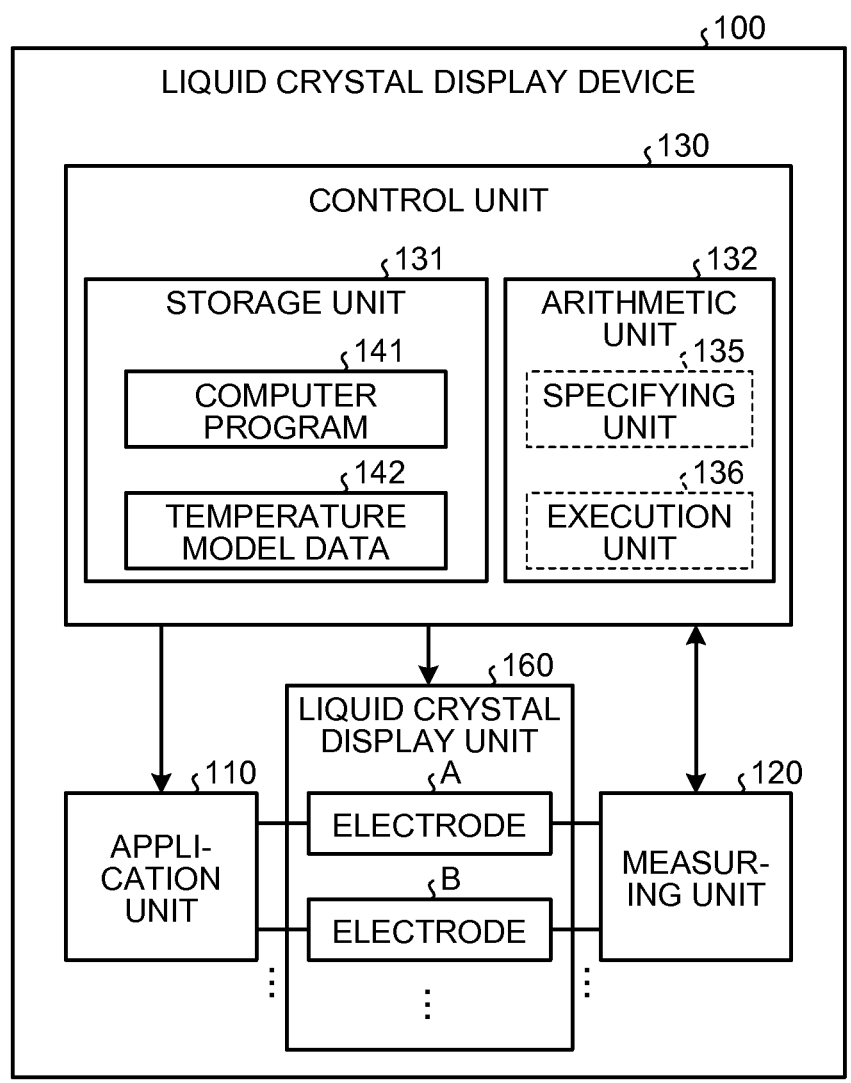
FIG. 1 is a block diagram illustrating a configuration of a principal function of a liquid crystal display device according to a first embodiment.

The following describes preferred embodiments of the present invention with reference to the drawings. The disclosure is merely an example, and the present invention naturally encompasses an appropriate modification maintaining the gist of the invention that is easily conceivable by those skilled in the art. To further clarify the description, a width, a thickness, a shape, and the like of each component may be schematically illustrated in the drawings as compared with an actual aspect. However, this is merely an example and interpretation of the invention is not limited thereto. The same element as that described in the drawing that has already been discussed is denoted by the same reference numeral through the description and the drawings, and detailed description thereof will not be repeated in some cases.

First, the following describes a first embodiment of the present invention with reference to FIG. 1 to FIG. 8. In the following description, a direction along a display surface is assumed to be an X-direction, a direction along the display surface and orthogonal to the X-direction is assumed to be a Y-direction, and a direction orthogonal to the X-direction and the Y-direction is assumed to be a Z-direction.

FIG. 1 is a block diagram illustrating a configuration of a principal function of a liquid crystal display device 100 according to the first embodiment. As illustrated in FIG. 1, the liquid crystal display device 100 includes a liquid crystal display unit 160, an application unit 110, a measuring unit 120, and a control unit 130.

The liquid crystal display device 100 is, for example, a matrix-type liquid crystal display. Specifically, the liquid crystal display device 100 includes a laminated substrate (for example, a glass substrate) in which a pixel substrate and a counter substrate are laminated. Pixel electrodes are arranged on the pixel substrate. Liquid crystals are sandwiched between the pixel substrate and the counter substrate. The liquid crystal display unit 160 is present in the laminated substrate. The application unit 110, the measuring unit 120, and the control unit 130 are mounted as circuits arranged on an external substrate coupled to the laminated substrate via a flexible printed circuit (FPC), for example.

Figure 2:
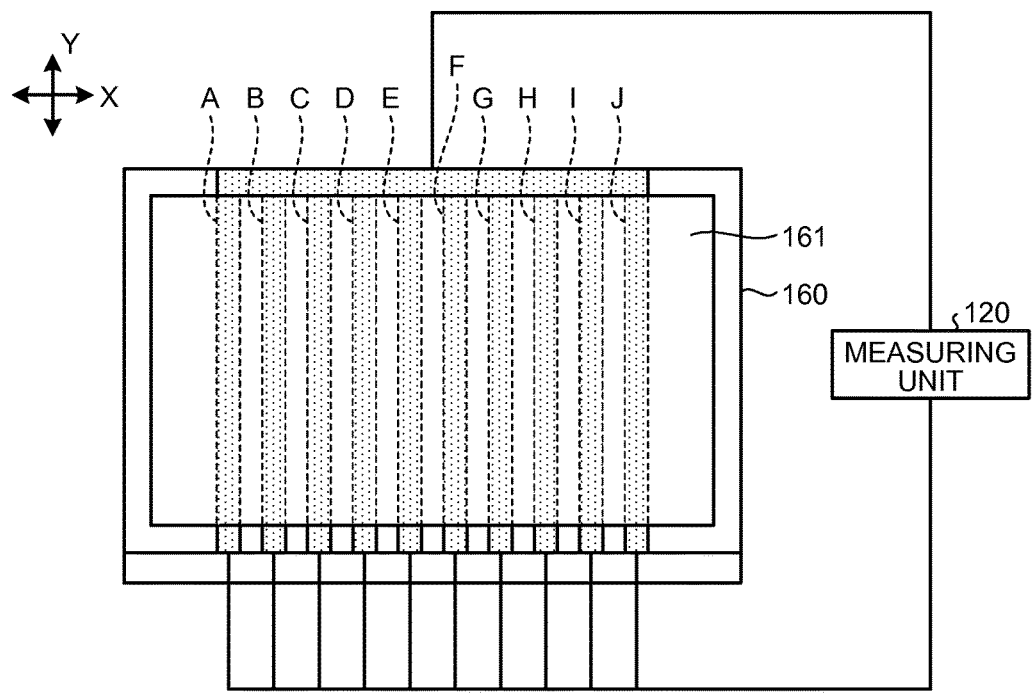
FIG. 2 is a diagram illustrating an example of an arrangement of a plurality of electrodes and coupling between the electrodes and a measuring unit.

FIG. 2 is a schematic diagram illustrating an example of an arrangement of a plurality of electrodes A to J arranged in a display area 161 of the liquid crystal display unit 160, and coupling between the electrodes A to J and the measuring unit 120. The liquid crystal display unit 160 includes a plurality of electrodes (for example, the electrodes A, B, C, D, E, F, G, H, I, and J) arranged in the liquid crystal display unit 160 along the display area 161 in which an image is displayed. Specifically, the electrodes A to J are arranged in parallel in one direction. Specifically, the electrodes A to J are arranged in parallel in the X-direction, for example, and are ten columns of electrodes. The longitudinal direction of the electrodes A to J is along the Y-direction. The electrodes A to J are transparent electrodes, and are made of, for example, indium tin oxide (ITO). The electrodes A to J are arranged in any of the pixel substrate or the counter substrate. A specific position of a layer in which the electrodes A to J are arranged is arbitrary in these substrates. Regarding the position of the layer of the electrodes A to J with respect to a laminating direction (Z-direction) of the substrates, the layer of the electrodes A to J is arranged to be closer to the liquid crystals sandwiched between the pixel substrate and the counter substrate. Therefore, the temperature of the liquid crystals in the liquid crystal display unit 160 can be specified with higher accuracy.

The application unit 110 applies electric signals to the electrodes A to J. Specifically, the application unit 110 includes, for example, a circuit that outputs predetermined pulse signals to the electrodes A to J as electric signals, and a controller that switches output of the pulse signals from the circuit. The application unit 110 is electrically coupled to the electrodes A to J, and outputs the pulse signals to the electrodes A to J. The pulse signals include a pulse signal for measuring an electric resistance value of each of the electrodes A to J and a pulse signal for heating for applying a voltage for causing the electrodes A to J to generate heat to the electrodes A to J.

The measuring unit 120 is a circuit that measures the electric resistance value of each of the electrodes A to J. The measuring unit 120 measures electric resistance values of the electrodes A to J based on current values flowed in the electrodes A to J or voltage values of the electrodes A to J according to a pulse signal for measurement applied by the application unit 110. The application unit 110 and the measuring unit 120 are coupled to the electrodes A to J via a switch for switching the electrodes A to J to be coupled to the application unit 110 and the measuring unit 120, for example. However, this is merely an example, and the embodiment is not limited thereto. Alternatively, the application unit 110 and the measuring unit 120 may be individually arranged for each of the electrodes A to J.

The control unit 130 controls an operation of each component of the liquid crystal display device 100. Specifically, the control unit 130 includes a storage unit 131 and an arithmetic unit 132. The storage unit 131 is a storage device for storing a computer program 141 and temperature model data 142. The computer program 141 includes, in addition to a computer program for controlling the operation of each component of the liquid crystal display device 100, a computer program for specifying the temperature of the liquid crystal display unit 160 based on the temperatures of the electrodes A to J indicated by the electric resistance values measured by the measuring unit 120, and a computer program for executing a command corresponding to the temperature of the liquid crystal display unit 160. The temperature model data 142 is data representing a relation between the electric resistance values of the electrodes A to J and the temperatures of the electrodes A to J. More specifically, the temperature model data 142 is data indicating that, when the electric resistance value of one of the electrodes is a certain electric resistance value (for example, an electric resistance value within a predetermined range), the electrode has a certain temperature (for example, a temperature within a predetermined range or a temperature equal to or lower than a predetermined temperature). That is, by using the temperature model data 142, the temperatures of the electrodes A to J can be obtained from the electric resistance values of the electrodes A to J. The control unit 130 executes the computer program 141, uses the electric resistance values of the electrodes A to J detected by the measuring unit 120 and the temperature model data 142 to specify the temperatures of the electrodes A to J from the electric resistance values of the electrodes A to J, and can execute a command based on the specified temperatures. Specifically, the arithmetic unit 132 reads out the computer program 141 from the storage unit 131 to be executed, and thereby functions as a specifying unit 135 and an execution unit 136. The specifying unit 135 performs an arithmetic operation for specifying temperature information corresponding to an electrical change (electric resistance value) detected by the measuring unit 120. The execution unit 136 executes the command based on the temperatures of the electrodes A to J (for example, the temperature specified by the specifying unit 135).

Figure 3:
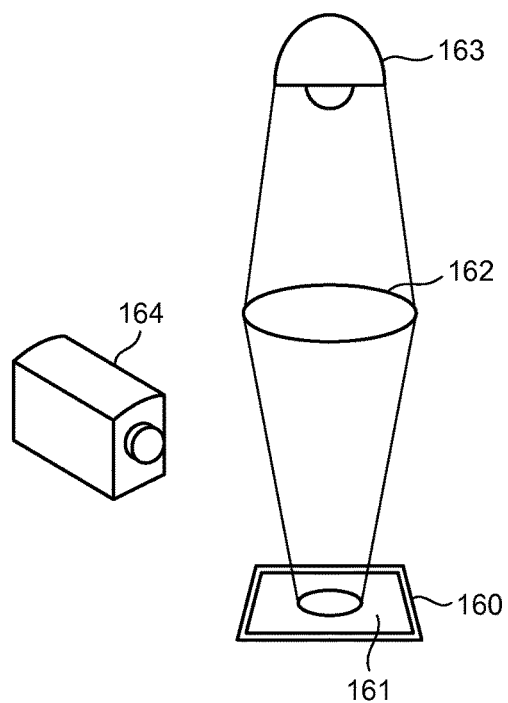
FIG. 3 is a diagram illustrating an example of a configuration related to a test for measuring variations in electric resistance values of the electrodes when a temperature of part of a display area is raised as compared with a temperature of the other part.
Figure 4:
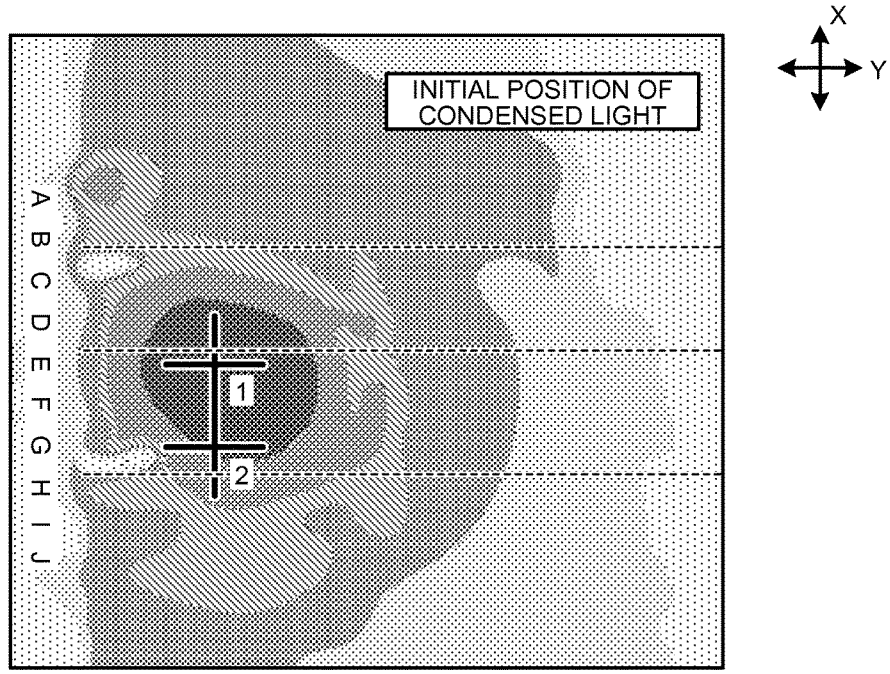
FIG. 4 is a diagram illustrating a temperature distribution in the display area when the center of condensation of light is positioned at one point in the display area.
Figure 5:
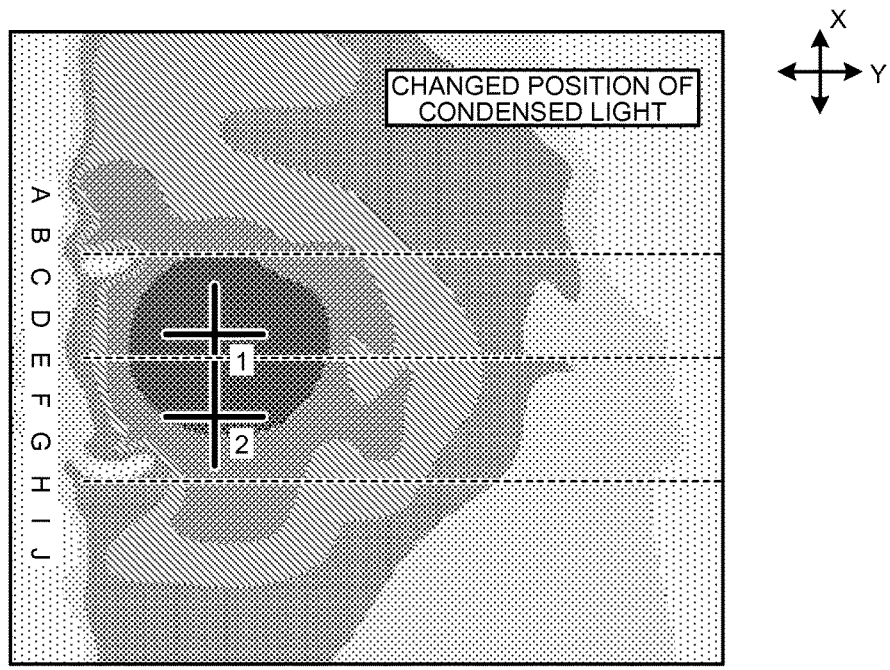
FIG. 5 is a diagram illustrating a temperature distribution in the display area when the center of condensation of light is positioned at one point different from that in FIG. 4 in the display area.
Figure 6:
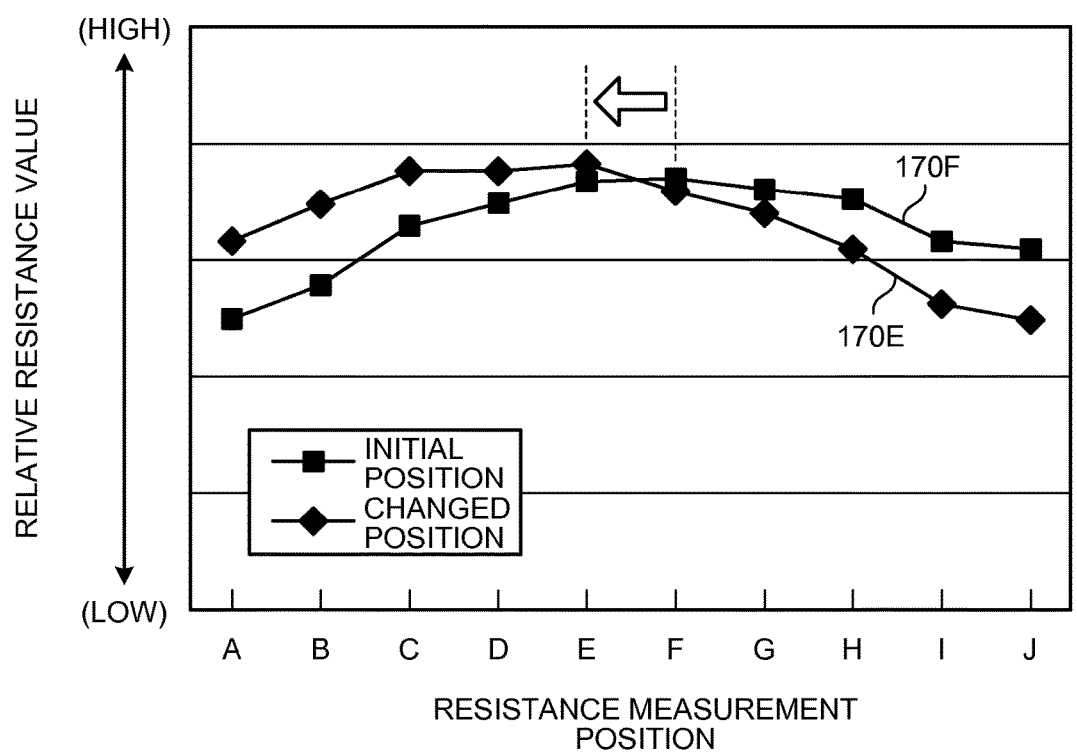
FIG. 6 is a diagram illustrating an example of electric resistance values of the electrodes according to the temperature distributions illustrated in FIG. 4 and FIG. 5.

FIG. 3 is a diagram illustrating an example of a configuration related to a test for measuring variations in the electric resistance values of the electrodes A to J when the temperature of part of the display area 161 is raised as compared with the temperature of the other part. FIG. 4 and FIG. 5 are diagrams illustrating an example of a temperature distribution in the display area 161. FIG. 4 is a diagram illustrating the temperature distribution when the center of condensation of light is positioned at one point in the display area 161. FIG. 5 is a diagram illustrating the temperature distribution when the center of condensation of light is positioned at one point different from that in FIG. 4 in the display area 161. FIG. 6 is a diagram illustrating an example of the electric resistance values of the electrodes A to J according to the temperature distributions illustrated in FIG. 4 and FIG. 5.

As illustrated in FIG. 3, the display area 161 is irradiated with light from a light source 163 such as an artificial sunlight lamp condensed via a condensing lens 162. A position on the display area 161 irradiated with the condensed light is movable. A thermography 164 measures the temperature of each part of the display area 161, and outputs an image indicating the temperature distribution of the display area 161 as illustrated in FIG. 4 and FIG. 5.

When the position on the display area 161 irradiated with the condensed light is moved from the electrode F to the electrode E during the measurement of the temperature by the thermography 164, as illustrated in FIG. 4 and FIG. 5, a portion having a higher temperature in the display area 161 moves from the electrode F to the electrode E. Following the change in the temperature distribution, the electric resistance values of the electrodes A to J measured by the measuring unit 120 are changed from a resistance value distribution curve 170F to a resistance value distribution curve 170E as illustrated in FIG. 6. That is, when the portion having a higher temperature in the temperature distribution in the display area 161 moves from the electrode F to the electrode E, a peak of the electric resistance value also moves from the electrode F to the electrode E. Thus, a variation in the temperature of each part of the display area 161 is linked with a variation in the electric resistance value indicated by each of the electrodes A to J arranged in each part of the display area 161. Accordingly, information indicating the temperature distribution in the X-direction in the display area 161 can be obtained by acquiring the electric resistance values of the electrodes A to J arranged in the display area 161.

Specifically, in this embodiment, the specifying unit 135 specifies respective temperatures corresponding to the electric resistance values of the electrodes A to J detected by the measuring unit 120 using a correspondence relation between the electric resistance value and the temperature represented by the temperature model data 142 to measure the temperatures of the electrodes A to J. Accordingly, the specifying unit 135 acquires, as the temperature of the liquid crystal display unit 160, information indicating the temperatures of the positions in the X-direction in the display area 161 corresponding to the positions at which the electrodes A to J are arranged. A method for specifying the temperature of the liquid crystal display unit 160 from the temperatures of the electrodes A to J is arbitrary. Specifically, for example, the specifying unit 135 may specify an average value of the temperatures of the electrodes A to J as the temperature of the liquid crystal display unit 160, or may specify the lowest or highest temperature among the temperatures of the electrodes A to J as the temperature of the liquid crystal display unit 160. Alternatively, depending on a purpose of the command executed by the execution unit 136, the method for specifying the temperature of the liquid crystal display unit 160 based on the temperatures of the electrodes A to J may be switched to specify the temperature for each purpose.

Based on the temperature of the liquid crystal display unit 160 specified by the specifying unit 135, for example, the execution unit 136 outputs, to the application unit 110, a command (heating command) for applying, to the electrodes A to J, the voltage for causing the electrodes A to J to generate heat. Specifically, when the temperature of the liquid crystal display unit 160 specified by the specifying unit 135 is equal to or lower than a certain first threshold (heating required temperature), the execution unit 136 outputs the heating command to the application unit 110. The application unit 110 applies the pulse signal for heating to any or some of the electrodes A to J according to the heating command to apply the voltage to the electrodes A to J. The electrodes A to J to which the pulse signal for heating is applied generate heat, and heats surroundings. Due to this, the liquid crystal display unit 160 is heated.

A degree of heating by the heating command and the pulse signal for heating can be appropriately changed. For example, the degree of heating of the electrodes A to J can be adjusted through control (PWM control) for modulating a pulse width of the pulse signal for heating. In this case, the execution unit 136 adjusts the degree of heating, for example, according to a difference between the temperature of the liquid crystal display unit 160 and the heating required temperature. The degree of heating can be controlled stepwise by determining the degree of heating corresponding to the temperature of the liquid crystal display unit 160 stepwise in advance, and setting a threshold corresponding to each step. The execution unit 136 may compare the temperatures of the electrodes A to J with the heating required temperature, and control the application unit 110 to apply the pulse signal for heating to the electrode having a temperature lower than the heating required temperature. In this case, the degree of heating of each electrode may be individually controlled depending on the difference between the temperature of each electrode and the heating required temperature.

The control unit 130 including the execution unit 136 also functions as an operation control unit that ends display of the image by the liquid crystal display unit 160 when the temperature of the liquid crystal display unit 160 specified by the specifying unit 135 is equal to or higher than the certain temperature. Specifically, when the temperature of the liquid crystal display unit 160 specified by the specifying unit 135 is equal to or higher than a certain second threshold (display ending temperature), the execution unit 136 outputs, to the liquid crystal display unit 160, a display ending command for ending the display of the image by the liquid crystal display unit 160. After the display ending command is output, the liquid crystal display unit 160 ends the operation, for example, to ends the display of the image by the liquid crystal display unit 160.

The temperature of the liquid crystal display unit 160 to be compared with the display ending temperature is the highest temperature among the temperatures of the electrodes A to J, for example. However, this is merely an example, and the embodiment is not limited thereto. For example, the temperature of the liquid crystal display unit 160 to be compared with the display ending temperature may be an average value of the temperatures of the electrodes A to J. The temperature of the liquid crystal display unit 160 to be compared with the display ending temperature is appropriately determined according to a method for setting the display ending temperature.

The heating required temperature and the display ending temperature are arbitrarily set, but the heating required temperature is lower than the display ending temperature. For example, considered is a case in which a display operational temperature of the liquid crystal display unit 160 is α (° C.) to β (° C.), and an optimum operation temperature is γ (° C.). In this case, α≤γ≤β is satisfied. When the heating required temperature is δ (° C.), for example, δ<γ is satisfied. When the display ending temperature is ε (° C.), for example, γ<ε≤β is satisfied. By setting the display ending temperature to be lower than β, a margin can be provided to the temperature of the liquid crystal display unit 160 when the display of the image is ended with respect to an upper limit of the operational temperature.

Figure 7:
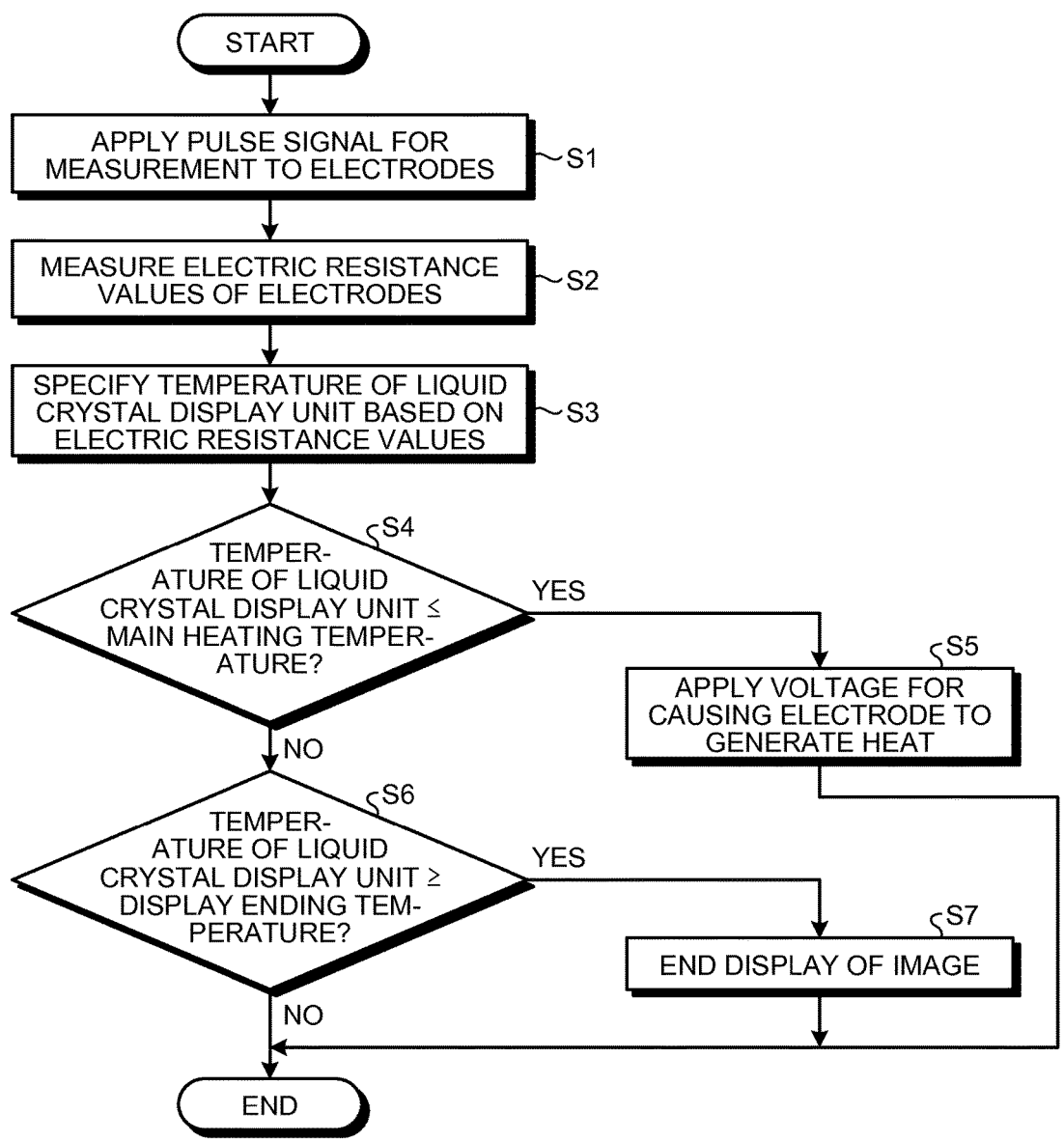
FIG. 7 is a flowchart illustrating an example of a processing procedure related to a temperature of a liquid crystal display unit.

FIG. 7 is a flowchart illustrating an example of a processing procedure related to the temperature of the liquid crystal display unit 160. The application unit 110 applies the pulse signal for measurement to the electrodes A to J (Step S1). The measuring unit 120 measures the electric resistance values of the electrodes A to J generated by the pulse signal for measurement applied at Step S1 (Step S2). The specifying unit 135 specifies the temperatures of the electrodes A to J based on the electric resistance values measured at Step S2 to specify the temperature of the liquid crystal display unit 160 (Step S3).

The execution unit 136 determines whether the temperature of the liquid crystal display unit 160 specified at Step S3 is equal to or lower than the heating required temperature (Step S4). If the temperature of the liquid crystal display unit 160 is determined to be equal to or lower than the heating required temperature (Yes at Step S4), the execution unit 136 outputs a heating command. The application unit 110 applies the pulse signal for heating to the electrodes A to J according to the heating command to apply, to the electrodes A to J, the voltage for causing the electrodes A to J to generate heat (Step S5). When the electrodes A to J generate heat according to the process at Step S5, the liquid crystal display unit 160 is heated. If the temperature of the liquid crystal display unit 160 is higher than the heating required temperature (No at Step S4), the execution unit 136 determines whether the temperature of the liquid crystal display unit 160 specified at Step S3 is equal to or higher than the display ending temperature (Step S6). If the temperature of the liquid crystal display unit 160 is equal to or higher than the display ending temperature (Yes at Step S6), the execution unit 136 outputs the display ending command to the liquid crystal display unit 160. According to the display ending command, the liquid crystal display unit 160 ends the display of the image (Step S7). If the temperature of the liquid crystal display unit 160 is higher than the heating required temperature and lower than the display ending temperature (No at Step S6), a particular operation corresponding to the temperature of the liquid crystal display unit 160 is not caused.

The process at Step S4 and the process at Step S6 are performed in random order. When the process at Step S6 is performed earlier than the process at Step S4, the process at Step S4 is performed if the temperature of the liquid crystal display unit 160 is determined to be lower than the display ending temperature at Step S6.

Figure 8:
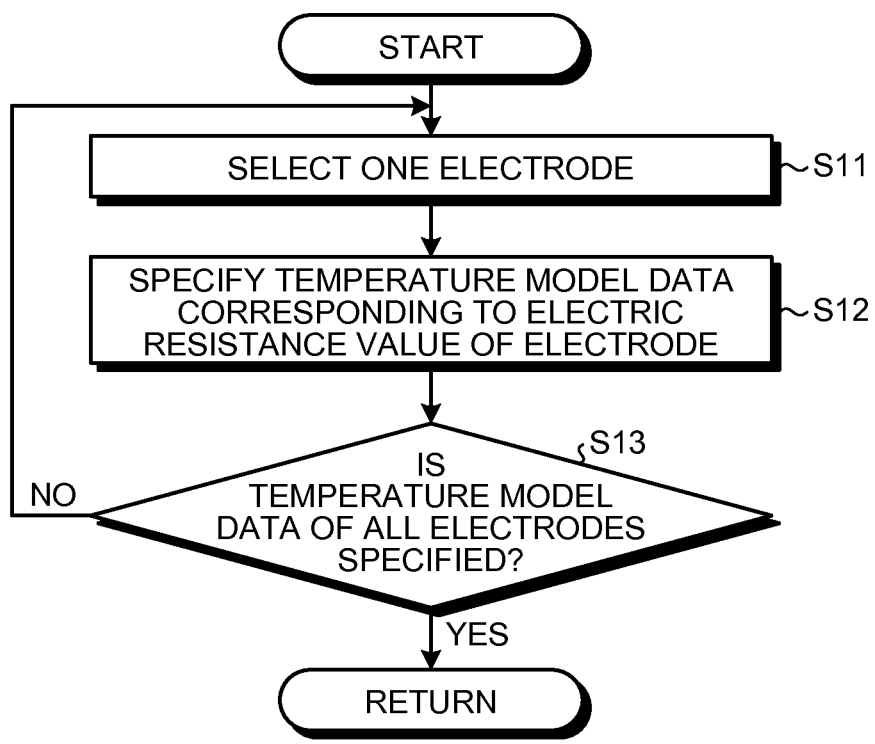
FIG. 8 is a sub-flowchart illustrating an example of specific processing details at Step S3 in the flowchart of FIG. 7.

FIG. 8 is a sub-flowchart illustrating an example of specific processing details at Step S3 in the flowchart of FIG. 7. The arithmetic unit 132 selects one electrode (for example, any one of the electrodes A, B, C, D, E, F, G, H, I, and J) the temperature information of which is not specified yet (Step S11). The arithmetic unit 132 specifies the temperature model data 142 corresponding to the electric resistance value of the electrode selected at Step S11 (Step S12). When the temperature model data 142 is specified, the temperature of the electrode indicated by the temperature model data 142 is specified. The arithmetic unit 132 determines whether the temperature model data 142 of all of the electrodes A to J is specified (Step S13). If the temperature model data 142 of all of the electrodes A to J is not specified yet (No at Step S13), the process proceeds to Step S11. If the temperature model data 142 of all of the electrodes A to J is specified (Yes at Step S13), the arithmetic unit 132 completes the process at Step S3. The temperatures of some or all of the electrodes may be specified in parallel instead of repeating the process of specifying the temperature of one electrode by the number of electrodes.

Timing for specifying the temperature of the liquid crystal display unit 160 is arbitrary. For example, the control unit 130 may perform processing for specifying the temperature of the liquid crystal display unit 160 (temperature specifying processing) immediately after the liquid crystal display device 100 is started (power source is turned on). Through the temperature specifying processing, the application unit 110 outputs the pulse signal for measurement, the measuring unit 120 measures the electric resistance values of the electrodes A to J, and the specifying unit 135 specifies the temperature of the liquid crystal display unit 160 based on the electric resistance values. "Immediately after the liquid crystal display device 100 is started" means the time immediately after the components of the liquid crystal display device 100 are caused to be in an operation-enabled (standby) state after the power source is turned on.

An execution time of heat processing by applying the voltage for heating from the application unit 110 is arbitrary. Preferably, the execution time is appropriately set according to heating values of the electrodes (for example, the electrodes A to J) obtained through the heat processing. For example, the control unit 130 may determine the execution time of the heat processing according to a difference between the temperature of the liquid crystal display unit 160 and the heating required temperature when the heat processing is determined to be performed. In this case, as the temperature of the liquid crystal display unit 160 becomes much lower than the heating required temperature, the execution time of the heat processing increases.

As described above, according to the first embodiment, the electrodes (for example, the electrodes A to J) are used for specifying the temperature of the liquid crystal display unit and for heating the liquid crystal display unit (for example, the liquid crystal display unit 160). Accordingly, a configuration for specifying the temperature and heating the unit can be further integrated. That is, the size of the liquid crystal display device can be further reduced, the liquid crystal display device including both of a configuration for measuring the temperature and a configuration for heating. The electrodes are arranged in the liquid crystal display unit in parallel with one direction (for example, the X-direction) along the display surface of the liquid crystal display unit. Due to this, the temperature can be specified at a position closer to the liquid crystals. That is, the temperature of a configuration containing the liquid crystals (for example, the liquid crystal display unit 160) can be measured with higher accuracy.

When the temperature of the liquid crystal display unit is equal to or higher than the certain temperature (for example, the display ending temperature), the display of the image by the liquid crystal display unit is ended. Due to this, when there is a possibility that a display operation is not normally performed because the temperature of the liquid crystals is too high, the display of the image can be ended in advance. Accordingly, an abnormal display operation can be prevented more securely.

Figure 9:
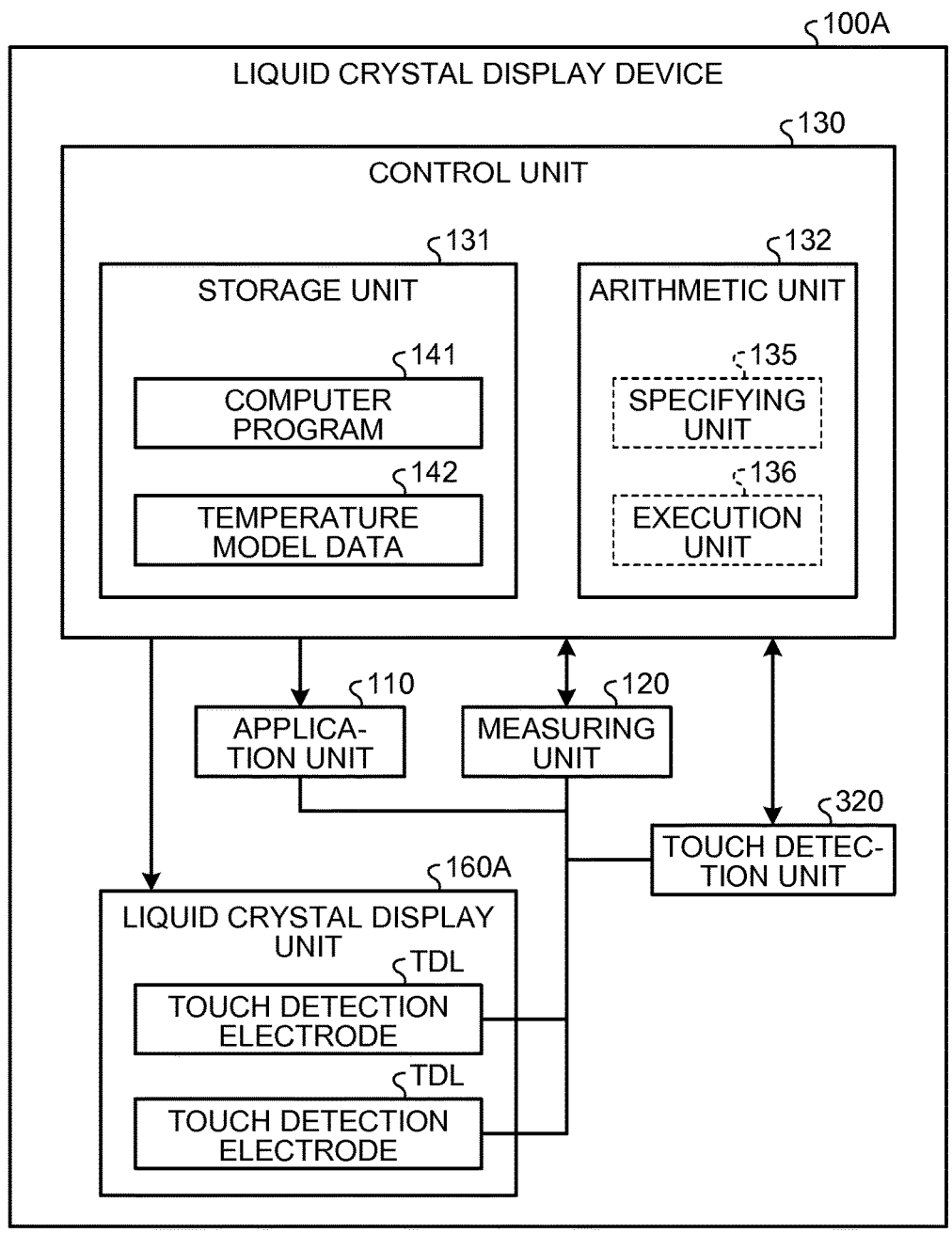
FIG. 9 is a block diagram illustrating a configuration of a principal function of a liquid crystal display device according to a second embodiment.

The following describes a second embodiment of the present invention with reference to FIG. 9 to FIG. 18. FIG. 9 is a block diagram illustrating a configuration of a principal function of a liquid crystal display device 100A according to the second embodiment. The liquid crystal display device 100A according to the second embodiment includes a liquid crystal display unit 160A described later in place of the liquid crystal display unit 160 in the liquid crystal display device 100 according to the first embodiment. The liquid crystal display device 100A according to the second embodiment includes a touch detection unit 320 in addition to the configuration of the liquid crystal display device 100 according to the first embodiment. The touch detection unit 320 detects proximity or contact of an object with respect to the display surface based on a change in capacitance of an electrode (touch detection electrode TDL described later). The touch detection unit 320 is mounted as a circuit arranged on an external substrate coupled to a laminated substrate included in the liquid crystal display unit 160A via a flexible printed circuit (FPC), for example.

Figure 10:
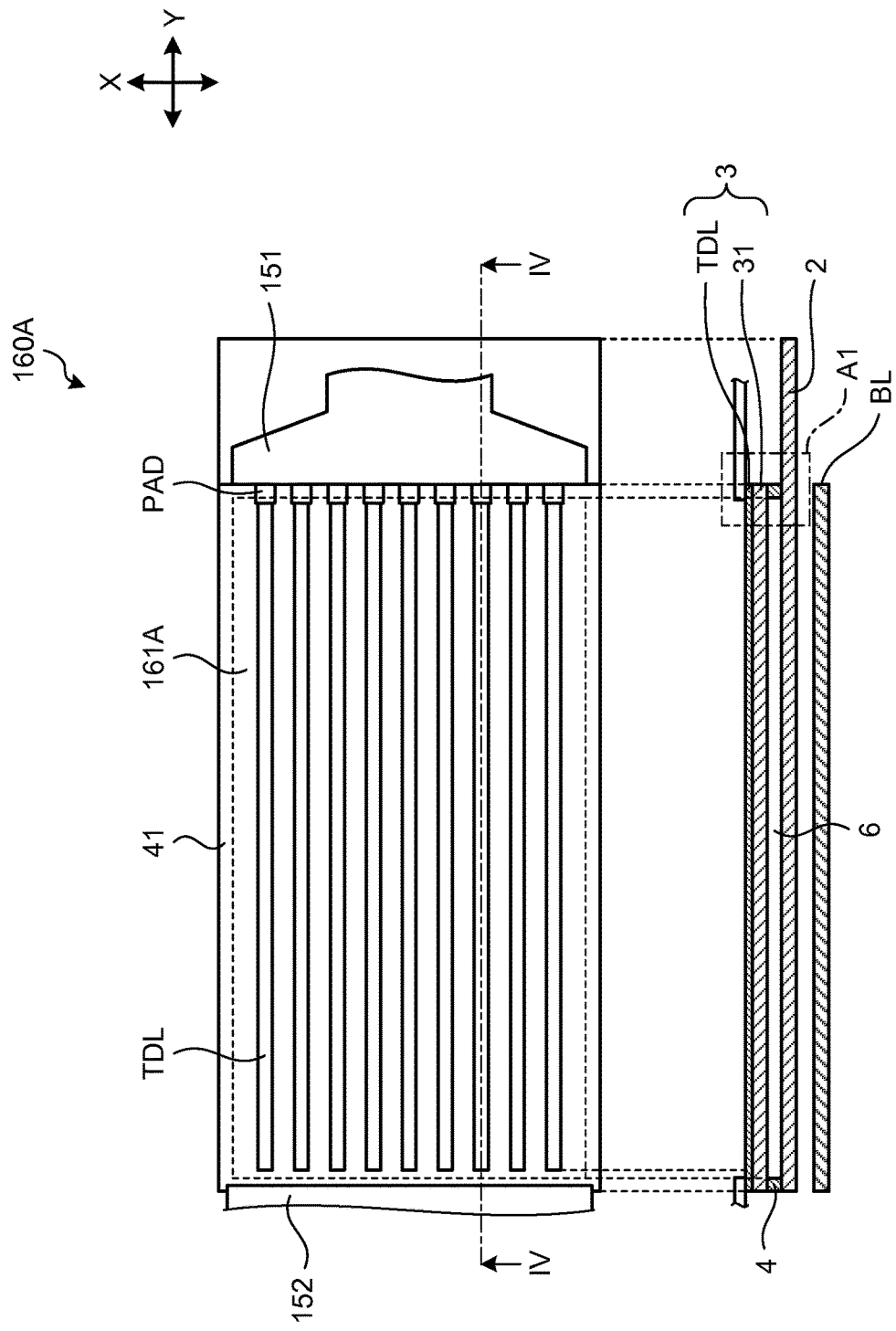
FIG. 10 is a diagram illustrating a configuration example of a liquid crystal display unit according to the second embodiment.
Figure 11:
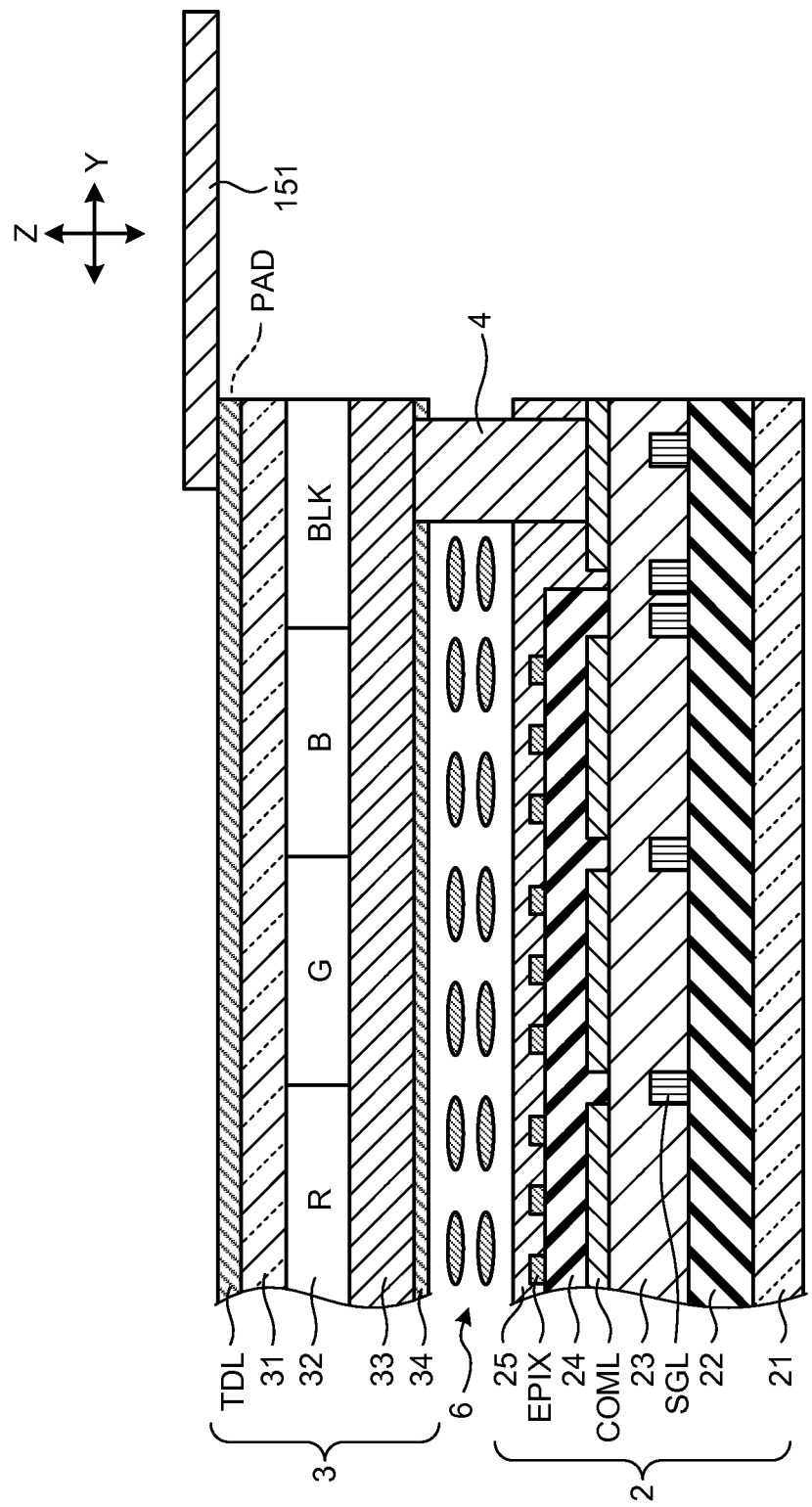
FIG. 11 is a diagram illustrating an example of a cross-sectional structure of a principal part (part A1) of FIG. 10 viewed from the arrow-IV direction.

FIG. 10 is a diagram illustrating a configuration example of the liquid crystal display unit 160A according to the second embodiment. FIG. 11 is a diagram illustrating an example of a cross-sectional structure of a principal part (part A1) of FIG. 10 viewed from the arrow-IV direction. The liquid crystal display unit 160A uses a liquid crystal display element as a display element, and is what is called an in-cell device integrating a liquid crystal display device including the liquid crystal display element and an electrostatic capacitance type touch detection device.

The liquid crystal display unit 160A includes a pixel substrate 2, a counter substrate 3, a first coupling part 151, a second coupling part 152, a liquid crystal layer 6, a seal 4, and a backlight BL.

As illustrated in FIG. 11, the pixel substrate 2 includes a TFT substrate 21 serving as a circuit board, a common electrode COML, and a pixel electrode EPIX. The TFT substrate 21 functions as a circuit board on which various electrodes, wiring, a thin film transistor (TFT), and the like are formed. The TFT substrate 21 is made of, for example, glass. An insulating film 22 is formed on the TFT substrate 21, and a signal line SGL is formed thereon. A planarizing film 23 made of, for example, acrylic organic resin is formed on the signal line SGL, and the common electrode COML is formed thereon. The common electrode COML is an electrode for supplying a common voltage to a plurality of pixels Pix (not illustrated), and has a translucent property. The common electrode COML is used also as an electrode for applying an AC rectangular wave Sg in a touch sensor. That is, the common electrode COML corresponds to a drive electrode of an input device that performs electrostatic capacitance type touch detection. An insulating film 24 is formed on the common electrode COML, and the pixel electrode EPIX is formed thereon. The pixel electrode EPIX is an electrode for supplying a pixel signal for performing display, and has a translucent property. The common electrode COML and the pixel electrode EPIX are made of ITO, for example. An orientation film 25 is formed on the pixel electrode EPIX.

As illustrated in FIG. 11, the counter substrate 3 includes a glass substrate 31, a color filter 32, and the touch detection electrodes TDL. The color filter 32 is formed on one surface of the glass substrate 31. The color filter 32 is configured such that color filter layers of three colors, for example, red (R), green (G), and blue (B) are periodically arranged together with a black matrix (BLK), and three colors of R, G, and B are associated with each display pixel as a group. A planarizing film 33 made of, for example, acrylic resin is formed under the color filter 32, and an orientation film 34 is formed thereunder. The touch detection electrodes TDL are arranged on the other surface of the glass substrate 31. The touch detection electrodes TDL are arranged extending in one direction (Y-direction) and in parallel along a direction orthogonal to the one direction (X-direction). The touch detection electrode TDL is an electrode that outputs a touch detection signal in the touch sensor. The touch detection electrode TDL is made of, for example, ITO, and has a translucent property. As illustrated in FIG. 10, the touch detection electrode TDL includes a terminal part PAD formed thereon, and is coupled to the first coupling part 151 via the terminal part PAD. The touch detection electrodes TDL illustrated in FIG. 10 are schematic, and do not represent an actual width of the touch detection electrode TDL and the number thereof.

The first coupling part 151 is a coupling part (electrode) used for taking out the touch detection signal of the touch detection electrode TDL to the outside, and for applying a voltage from the application unit 110 to the touch detection electrode TDL. Wiring such as an FPC is coupled to the first coupling part 151, for example, and the first coupling part 151 is coupled to the application unit 110 and the touch detection unit 320 via the wiring. The first coupling part 151 is arranged at one side of the counter substrate 3, for example. The first coupling part 151 is coupled, for example, to the application unit 110 or the touch detection unit 320 via a switch 311 described later. The first coupling part 151 is coupled, for example, to the measuring unit 120 via a switch 312 described later (refer to FIG. 12).

The second coupling part 152 is a coupling part (electrode) used for applying a voltage from the application unit 110 to the touch detection electrode TDL. The second coupling part 152 is arranged opposite to the first coupling part 151 across the touch detection electrode TDL, for example, and is coupled to the application unit 110 via a switch 313 (refer to FIG. 12).

The first coupling part 151 and the second coupling part 152 may also be used for coupling the measuring unit 120 and the touch detection electrode TDL.

The liquid crystal layer 6 functions as a display function layer, and modulates light passing therethrough depending on a state of an electric field. The electric field is formed by a potential difference between the voltage of the common electrode COML and the voltage of the pixel electrode EPIX. Liquid crystals of lateral electric-field mode such as in-plane switching (IPS) mode are used for the liquid crystal layer 6.

The seal 4 seals the liquid crystal layer 6 between the pixel substrate 2 and the counter substrate 3. As a material for the seal 4, for example, epoxy resin is used. The seal 4 is formed at an outer edge portion 41 of the pixel substrate 2 and the counter substrate 3. An inner side from the outer edge portion 41 is a display area 161A. The inner side from the outer edge portion 41 on an opened surface of the counter substrate 3 (a surface opposite to the side facing the pixel substrate 2) is the display surface.

The backlight BL emits light from the pixel substrate 2 side to a display region in which the liquid crystal layer 6 is arranged. The backlight BL includes, for example, a plurality of light emitting diodes (LEDs) and a light guide plate. Light emitted from the LEDs is guided by the light guide plate to be light emission from a plane region.

Figure 12:
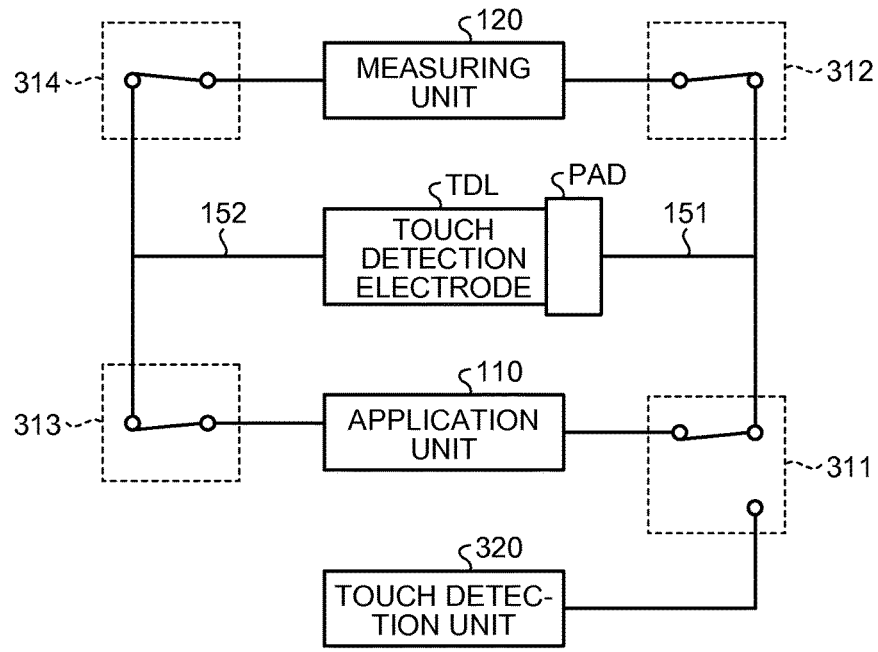
FIG. 12 is a diagram illustrating an example of a configuration of electrical coupling with respect to a touch detection electrode, and illustrating a coupling example when the electric resistance value of the touch detection electrode is measured.

FIG. 12 is a diagram illustrating an example of a configuration of electrical coupling with respect to the touch detection electrode TDL. Although FIG. 12 illustrates only electrical coupling for one touch detection electrode TDL, the electrical coupling is common to all of the touch detection electrodes TDL used for processing related to the temperature. The switch 311 selectively couples any of the application unit 110 and the touch detection unit 320 to the touch detection electrode TDL that is coupled to the switch 311 via the first coupling part 151 and the terminal part PAD. The switch 312 switches coupling and decoupling of the measuring unit 120 to/from the touch detection electrode TDL that is coupled to the switch 312 via the first coupling part 151 and the terminal part PAD. The switch 313 switches coupling and decoupling of the application unit 110 to/from the touch detection electrode TDL that is coupled to the switch 313 via the second coupling part 152. A switch 314 switches coupling and decoupling of the measuring unit 120 to/from the touch detection electrode TDL that is coupled to the switch 314 via the second coupling part 152.

When the electric resistance value of the touch detection electrode TDL is measured, as illustrated in FIG. 12, the application unit 110 is coupled to the touch detection electrode TDL via the switches 311 and 313. The measuring unit 120 is coupled to the touch detection electrode TDL via the switches 312 and 314. When the pulse signal for measurement is applied from the application unit 110 in this state, the measuring unit 120 measures the electric resistance value of the touch detection electrode TDL. Based on the electric resistance value, the specifying unit 135 specifies the temperature of the liquid crystal display unit 160A in which the touch detection electrode TDL is arranged. A specific method for specifying the temperature using the touch detection electrode TDL is the same as that in the first embodiment using the electrodes A to J.

The touch detection electrode TDL, the application unit 110, and the measuring unit 120 are coupled to each other in a state in which a two-terminal method or a four-terminal method is established, for example. The coupling can be appropriately changed so long as the measuring unit 120 can measure the electric resistance value of the touch detection electrode TDL.

Figure 13:
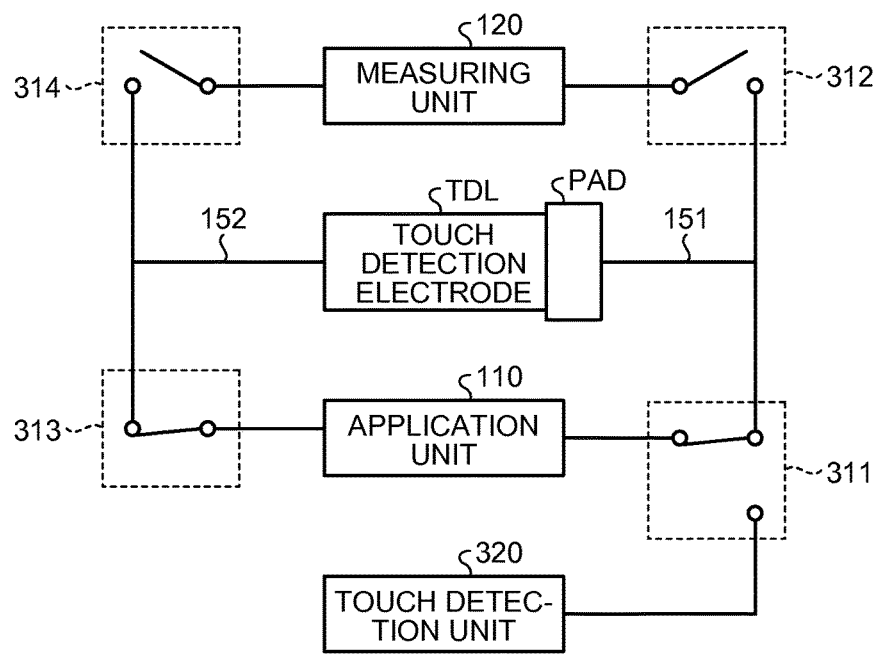
FIG. 13 is a diagram illustrating a coupling example when the touch detection electrode is heated.

FIG. 13 is a diagram illustrating a coupling example when the touch detection electrode TDL is heated. As illustrated in FIG. 13, when the touch detection electrode TDL is heated, the application unit 110 is coupled to the touch detection electrode TDL via the switches 311 and 313. The switches 312 and 314 are caused to be in a decoupling state. When the pulse signal for heating is applied from the application unit 110 in this state, the touch detection electrode TDL generates heat to heat the liquid crystal display unit 160A.

Figure 14:
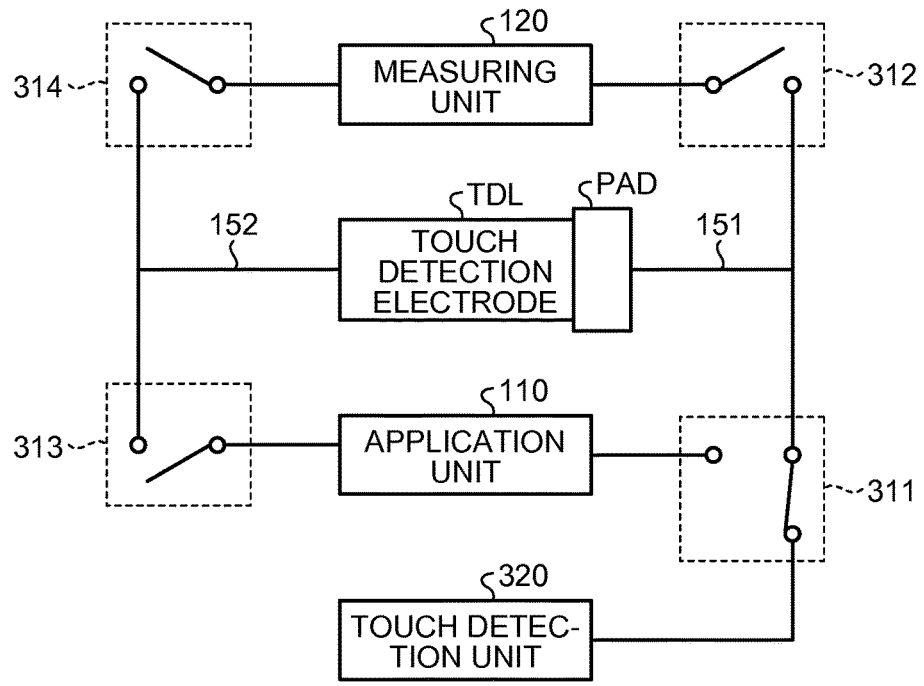
FIG. 14 is a diagram illustrating a coupling example when touch detection is performed.

FIG. 14 is a diagram illustrating a coupling example when touch detection is performed. As illustrated in FIG. 14, when touch detection is performed, the touch detection unit 320 is coupled to the touch detection electrode TDL via the switch 311. The switches 312, 313, and 314 are caused to be in a decoupling state. In this state, the touch detection unit 320 performs touch detection.

In this way, the touch detection unit 320 is electrically coupled to the electrode (touch detection electrode TDL) via at least one coupling part (for example, the first coupling part 151), and the application unit 110 is electrically coupled to the electrode via two coupling parts (for example, the first coupling part 151 and the second coupling part 152) including the former coupling part.

Examples of a touch detection system utilizing a change in capacitance include, but are not limited to, a self-capacitance system and a mutual capacitance system. In a case of the self capacitance system, the touch detection unit 320 is coupled to the touch detection electrode TDL only via the switch 311. In this case, the touch detection unit 320 detects, as the touch detection signal, an increase in capacitance of the touch detection electrode TDL due to proximity or contact of an object with respect to the display surface to detect proximity or contact the object with respect to the display surface. In a case of the mutual capacitance system, the touch detection unit 320 is coupled to the touch detection electrode TDL via the switch 311, and is also coupled to the common electrode COML. The touch detection unit 320 outputs a pulse signal for touch detection to the common electrode COML. The pulse signal causes an electric field between the common electrode COML and the touch detection electrode TDL, and capacitance corresponding to the electric field is detected from the touch detection electrode TDL. When the object is proximate to or brought into contact with the display surface in this state, a degree of generation of the electric field is decreased between the common electrode COML and the touch detection electrode TDL, so that the capacitance corresponding to the electric field is also decreased. The touch detection unit 320 detects the decrease in capacitance as a touch detection signal to detect proximity or contact of the object with respect to the display surface. In the second embodiment, any of the self capacitance system and the mutual capacitance system can be employed. In the second embodiment, for example, detection using the self capacitance system is performed after the liquid crystal display device 100A starts to be operated until proximity or contact of the object with respect to the display surface is detected, or after a predetermined time has elapsed after proximity or contact of the object is lastly detected. Detection using the mutual capacitance system is performed until a predetermined time has elapsed after proximity or contact of the object is detected.

The switch 313 may be configured to switch coupling and decoupling between the application unit 110 and the common electrode COML. That is, two coupling parts that electrically couple the application unit 110 to the electrode may be the common electrode COML and the first coupling part 151. In this case, the application unit 110 and the touch detection unit 320 share the two coupling parts (for example, the first coupling part 151 and the common electrode COML).

Figure 15:
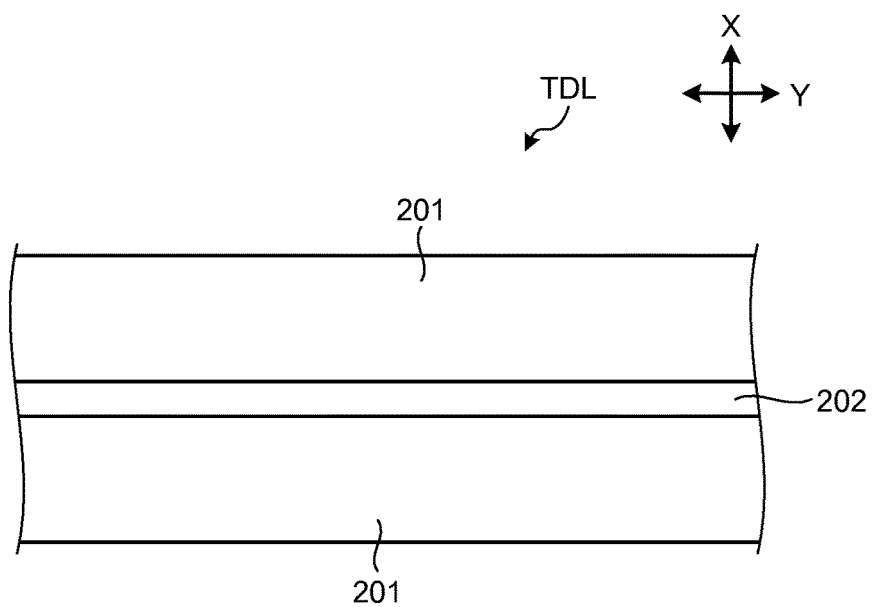
FIG. 15 is an enlarged view of the touch detection electrode.

Next, the following describes a structure of the touch detection electrode TDL with reference to FIG. 15. FIG. 15 is an enlarged view of the touch detection electrode TDL. As illustrated in FIG. 15, the touch detection electrode TDL includes a base 201 made of ITO, and an auxiliary wiring part 202 that is arranged at the center in the width direction (X-direction) of the base 201 and extends along an extending direction (Y-direction) of the touch detection electrode TDL. The auxiliary wiring part 202 is made of, for example, a composite material including an indium-based oxide (IM), a molybdenum-niobium compound (Mo—Nb), an aluminum-neodymium compound (Al—Nd), and a molybdenum-neodymium compound (Mo—Nd). However, this is merely an example of a specific configuration of the auxiliary wiring part 202, and the embodiment is not limited thereto. The auxiliary wiring part 202 is made of a material having the heating value (temperature coefficient) higher than that of the base 201 made of ITO, the heating value corresponding to a predetermined current that is caused to flow in the touch detection electrode TDL according to the voltage applied from the application unit 110. Due to this, the liquid crystal display unit 160A can be more efficiently heated using the heat generated by the touch detection electrode TDL. The auxiliary wiring part 202 is not necessarily required to be a transparent electrode. A material and a width of the auxiliary wiring part 202 are determined considering transmittance of light from the backlight BL in each component arranged on the pixel substrate 2 and the counter substrate 3.

In the second embodiment, the touch detection electrode TDL arranged in parallel in the X-direction are separated into predetermined groups. In this case, the touch detection electrodes TDL belonging to the same group are electrically coupled to each other. Specifically, for example, bases 201 of the touch detection electrodes TDL belonging to the same group are physically coupled to each other. Auxiliary wiring parts 202 of the touch detection electrodes TDL belonging to the same group are coupled to each other at their ends (refer to FIG. 16). In the second embodiment, each of a minimum unit of touch detection, a minimum unit for specifying the temperature of the touch detection electrode TDL, and a minimum control unit for heating the liquid crystal display unit 160A corresponds to a unit of the group of the touch detection electrodes TDL.

Figure 16:
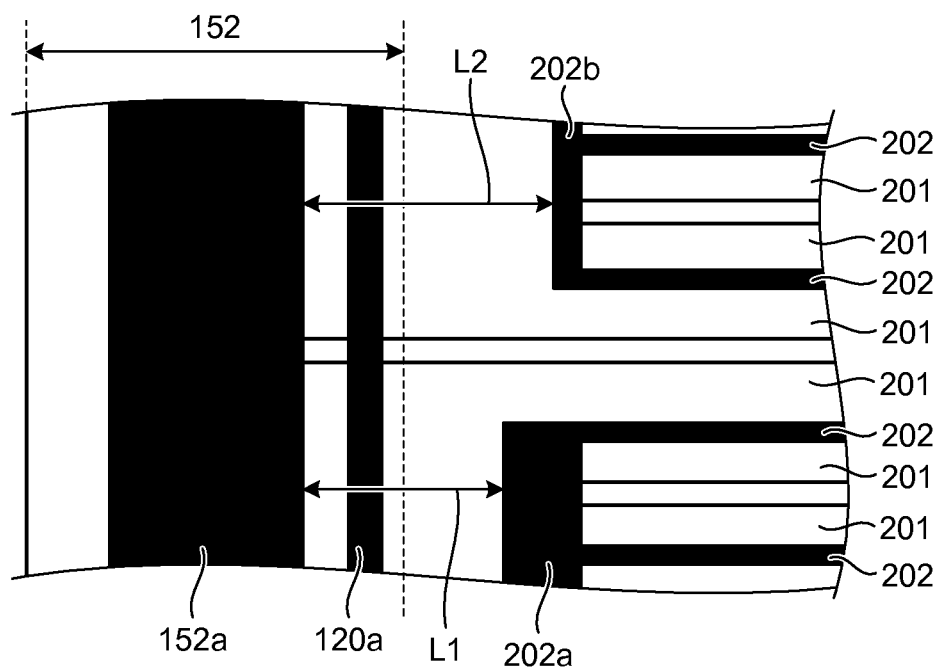
FIG. 16 is a diagram illustrating a specific example of electrical coupling between the touch detection electrode and a power line in a second coupling part.

FIG. 16 is a diagram illustrating a specific example of electrical coupling between the touch detection electrode TDL and a power line 152a in the second coupling part 152. As illustrated in FIG. 16, the second coupling part 152 includes the power line 152a for sharing, with the touch detection electrode TDL, electric power obtained by applying the voltage from the application unit 110. The base 201 of the touch detection electrode TDL is directly and physically coupled to the power line 152a. End parts 202a and 202b at which the auxiliary wiring parts 202 of the touch detection electrodes TDL belonging to the same group are coupled to each other are not directly and physically coupled to the power line 152a. Specifically, as illustrated in FIG. 16, the end parts 202a and 202b along the X-direction are arranged in parallel with the power line 152a along the X-direction.

Groups of the touch detection electrodes TDL positioned at both ends in the X-direction are likely to be cooled due to an external factor as compared with the other groups of the touch detection electrodes TDL positioned on an inner side in the X-direction. Due to this, if the heating values of the touch detection electrodes TDL in each group are uniform, the temperature of the groups of the touch detection electrodes TDL positioned at both ends in the X-direction are likely to be lower than that of the other groups of the touch detection electrodes TDL. Accordingly, the groups of the touch detection electrodes TDL positioned at both ends in the X-direction are arranged so that the heating values thereof are larger than that of the other groups of the touch detection electrodes TDL when the voltage for causing the touch detection electrode TDL to generate heat is applied. Specifically, for example, a distance L1 between the power line 152a and each of the end parts 202a of the groups of the touch detection electrodes TDL positioned at both ends in the X-direction is smaller than a distance L2 between the power line 152a and each of the end parts 202b of the other groups of the touch detection electrodes TDL. Due to this, the electric resistance value between the end part 202a and the power line 152a is smaller than the electric resistance value between the end part 202b and the power line 152a.

Accordingly, an electric current larger than that in the other groups of the touch detection electrodes TDL flows in the groups of the touch detection electrodes TDL positioned at both ends in the X-direction. That is, the heating values of the groups of the touch detection electrodes TDL positioned at both ends in the X-direction are larger than that of the other groups of the touch detection electrodes TDL when the pulse signal for heating is applied from the application unit 110. In this way, by causing the heating values of the groups of the touch detection electrodes TDL positioned at both ends in the X-direction to be larger than that of the other groups of the touch detection electrodes TDL, a temperature distribution in the entire liquid crystal display unit 160A can be more uniform.

Although the touch detection electrodes TDL are separated into some groups in the second embodiment, the touch detection electrodes TDL are not necessarily separated into groups. In this case, similarly to the case of grouping, by individually setting the distance between the power line 152a and the end of the auxiliary wiring part 202 as described above according to a condition related to the temperature of each of the touch detection electrodes TDL such as an external cooling factor, the temperature distribution in the entire liquid crystal display unit 160A can be more uniform.

As illustrated in FIG. 16, a resistance measuring line 120a coupled to the measuring unit 120 may be arranged between the power line 152a and the end parts 202a and 202b. In this case, the specifying unit 135 specifies the temperature of the touch detection electrode TDL in each group based on a difference in the electric resistance values due to the difference between a distance from the resistance measuring line 120a to the end part 202a and a distance from the resistance measuring line 120a to the end part 202b of each group. Specifically, the specifying unit 135 specifies the temperature of each group of the touch detection electrodes TDL using the temperature model data 142 that is provided based on the difference between the distance from the resistance measuring line 120a to the end part 202a and L2 from the resistance measuring line 120a to the end part 202b of each group, for example.

The touch detection electrode TDL illustrated in FIG. 10 and others has a shape having an outer edge along the Y-direction, but this is merely an example of the shape of the touch detection electrode TDL. The shape of the touch detection electrode TDL is not limited thereto, and can be appropriately changed.

Figure 17:
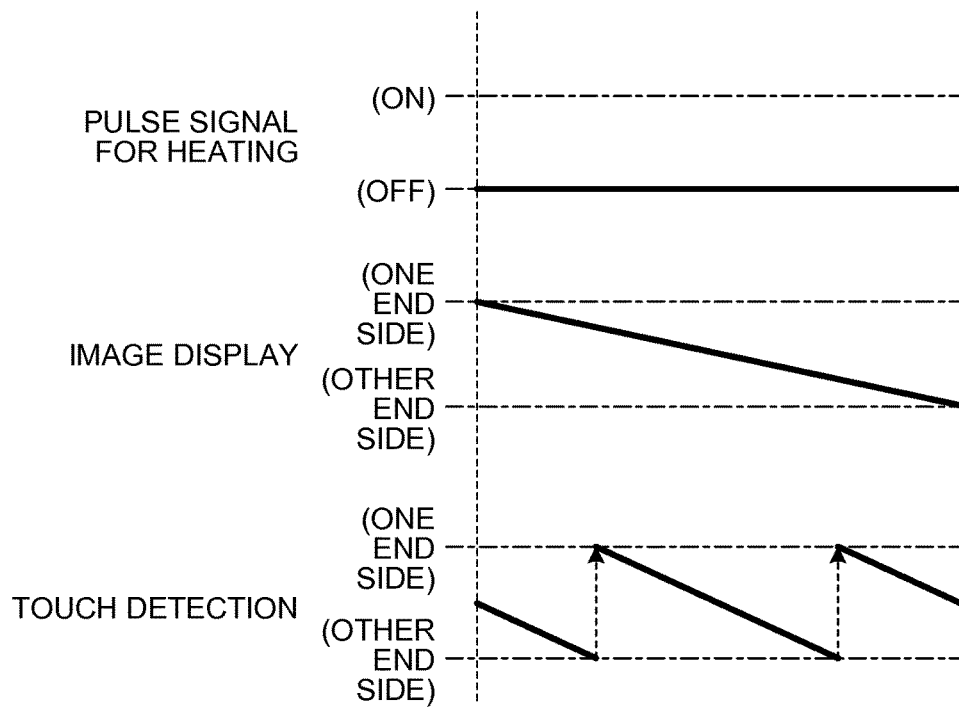
FIG. 17 is a diagram illustrating an example of a relation between a rewriting time for rewriting an image in the liquid crystal display unit, a touch detecting time by the touch detection unit, and an application time of a voltage for heating by an application unit.
Figure 18:
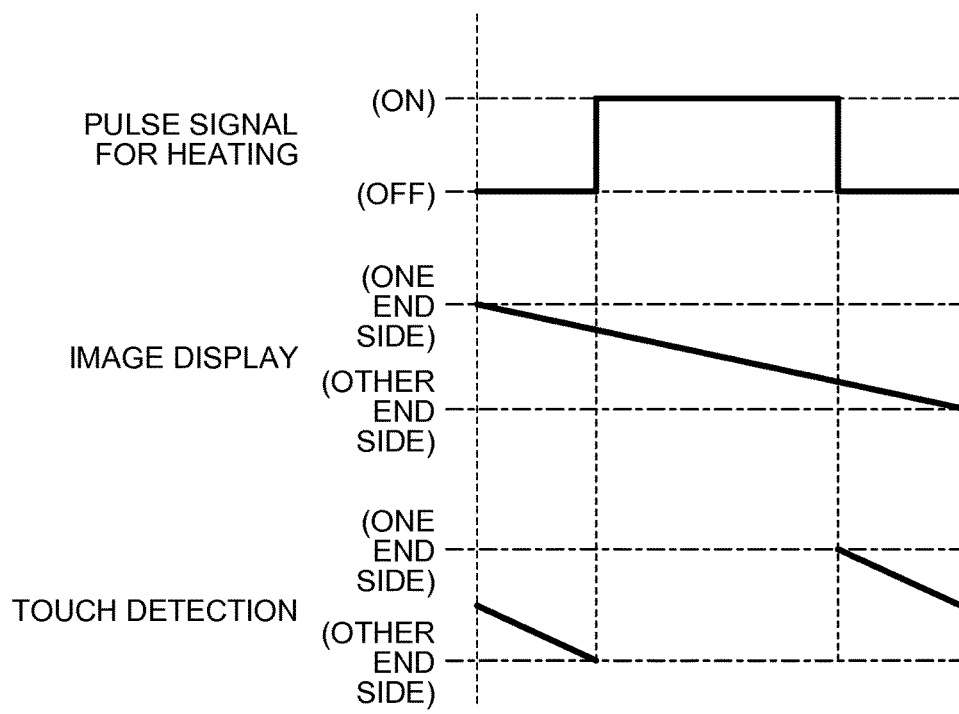
FIG. 18 is a diagram illustrating another example of the relation between the rewriting time for rewriting an image in the liquid crystal display unit, the touch detecting time by the touch detection unit, and the application time of a voltage for heating by the application unit.

FIG. 17 and FIG. 18 are diagrams illustrating an example of a relation between a rewriting time for rewriting the image in the liquid crystal display unit 160A, a touch detecting time by the touch detection unit 320, and an application time of a voltage for heating by the application unit 110. For example, when $\delta < \xi < \epsilon$ is satisfied assuming that the temperature of the liquid crystal display unit 160A is $\xi$ (° C.), the liquid crystal display unit 160A is not heated, display is not ended, and the liquid crystal display unit 160A operates. In this case, as illustrated in FIG. 17 for example, the control unit 130 rewrites the image displayed by the liquid crystal display unit 160A at a predetermined refresh rate, and detects proximity or contact of an object with respect to the display surface in a predetermined touch detection cycle. The touch detection unit 320 performs touch detection processing to scan the display surface by performing, for example, touch detection processing using the group of the touch detection electrodes TDL on one end in the X-direction among the touch detection electrodes TDL arranged in parallel in the X-direction, and subsequently, performing touch detection processing using the group of the touch detection electrodes TDL adjacent to the other end side. After completing touch detection processing using the group of the touch detection electrodes TDL on the outermost end of the other end side, the touch detection unit 320 performs touch detection processing using the group of the touch detection electrodes TDL on the one side again. In this way, the touch detection processing is repeated. FIG. 17 illustrates an example of a case of performing touch detection processing for operating the display surface two times within a time in which the image is once refreshed. However, this is merely an example, and the embodiment is not limited thereto. A relation between the refresh rate of the image and the cycle of the touch detection processing is arbitrary.

In other words, when the liquid crystal display unit 160A is not required to be heated, as illustrated in FIG. 17, the control unit 130 causes an assignment time for using the touch detection electrode TDL for heating to be zero, and assigns the entire time utilizing the touch detection electrode TDL to the touch detection processing.

When the liquid crystal display unit 160A is heated, the control unit 130 assigns the application time of a voltage for heating by the application unit 110 and the touch detecting time by the touch detection unit 320 in a time division manner. Specifically, the control unit 130 assigns, to heat processing, a time in which the touch detection processing is once performed from among the time in which the touch detection processing is performed two times within the time in which the image is once refreshed, for example. In this case, as illustrated in FIG. 18, every time when the display surface is once scanned through the touch detection processing within the time in which the image is once refreshed, the application unit 110 outputs the pulse signal for heating to the touch detection electrode TDL for a time period equal to the scanning time. In this way, the control unit 130 of the liquid crystal display device 100A assigns the application time of a voltage for heating by the application unit 110 and the touch detecting time by the touch detection unit 320 in a time division manner according to the temperature of the liquid crystal display unit 160A.

An assignment ratio of the application time of a voltage for heating by the application unit 110 and the touch detecting time by the touch detection unit 320 is arbitrary. The control unit 130 may change a ratio of the application time of a voltage for heating by the application unit 110 depending on a difference between the temperature of the liquid crystal display unit 160A and the heating required temperature in a case in which the temperature of the liquid crystal display unit 160A is equal to or lower than the heating required temperature. Specifically, for example, when the temperature of the liquid crystal display unit 160A is equal to or lower than a lower limit of the display operational temperature, the entire time utilizing the touch detection electrode TDL may be assigned to heat processing, and the time assigned to touch detection processing may be caused to be zero. The control unit 130 may reduce the time assigned to heat processing as the temperature of the liquid crystal display unit 160A comes close to the optimum operation temperature.

According to the second embodiment, proximity or contact of the object with respect to the display surface can be detected based on a change in the capacitance of the electrode (touch detection electrode TDL) in addition to the effect of the first embodiment. Due to this, the configuration for specifying the temperature, heating, and performing touch detection can be further integrated. That is, the size of the liquid crystal display device can be further reduced, the liquid crystal display device including all of a configuration related to measurement of the temperature, a configuration related to heating, and a configuration related to touch detection.

The application time of a voltage applied by the application unit 110 and the touch detecting time by the touch detection unit 320 are assigned in a time division manner according to the temperature of the liquid crystal display unit 160A. Accordingly, heating of the liquid crystal display unit 160A and touch detection with respect to the display surface can be performed in parallel. When stronger heating is required, the liquid crystal display unit 160A can be heated more quickly by increasing a rate of the time assigned to heat processing. When touch detection with higher accuracy is required, update frequency of a touch detection result can be increased by increasing a rate of the time assigned to touch detection processing to increase execution frequency of touch detection processing, so that the touch detection result with higher accuracy can be obtained.

Of the first coupling part 151 and the second coupling part 152 used for coupling the application unit 110 to the touch detection electrode TDL, for example, the second coupling part 152 is also used for coupling the touch detection unit 320 to the touch detection electrode TDL. Due to this, the configuration for coupling with respect to the touch detection electrode TDL can be further integrated. That is, the size of the liquid crystal display device can be further reduced.

Figure 19:
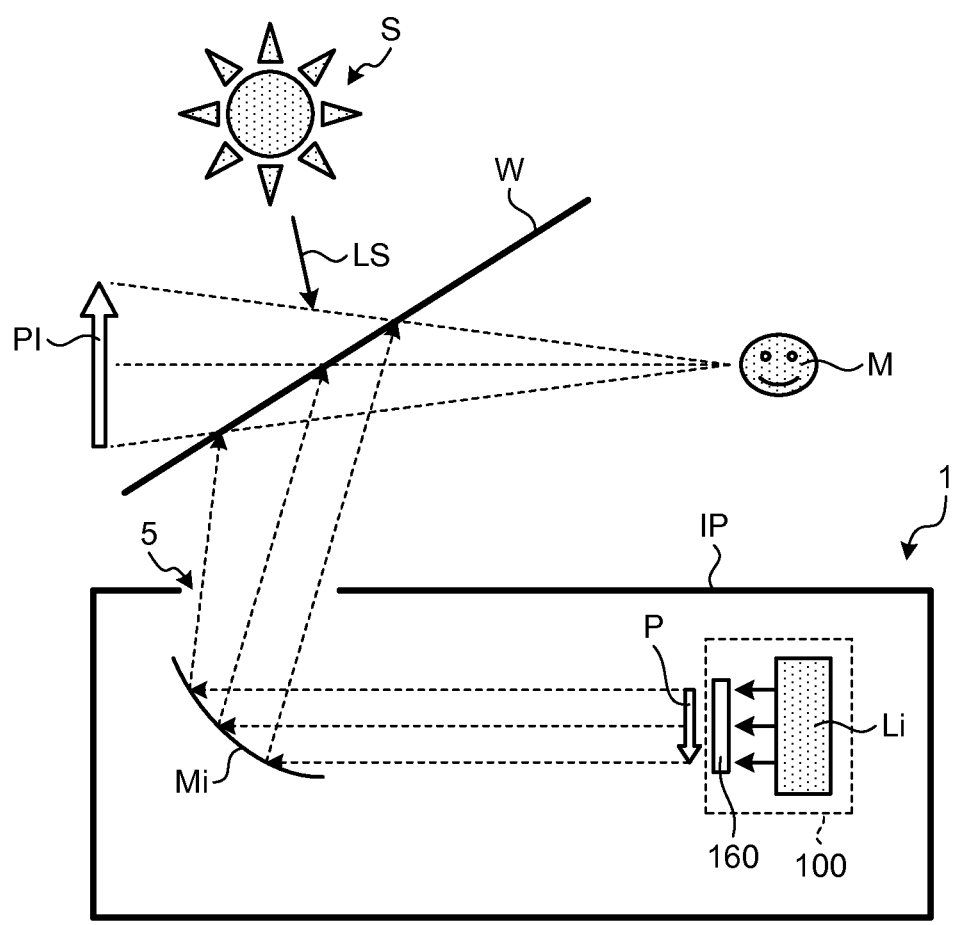
FIG. 19 is a schematic diagram illustrating a head-up display device to which the liquid crystal display device according to the present invention is applied.
Figure 20:
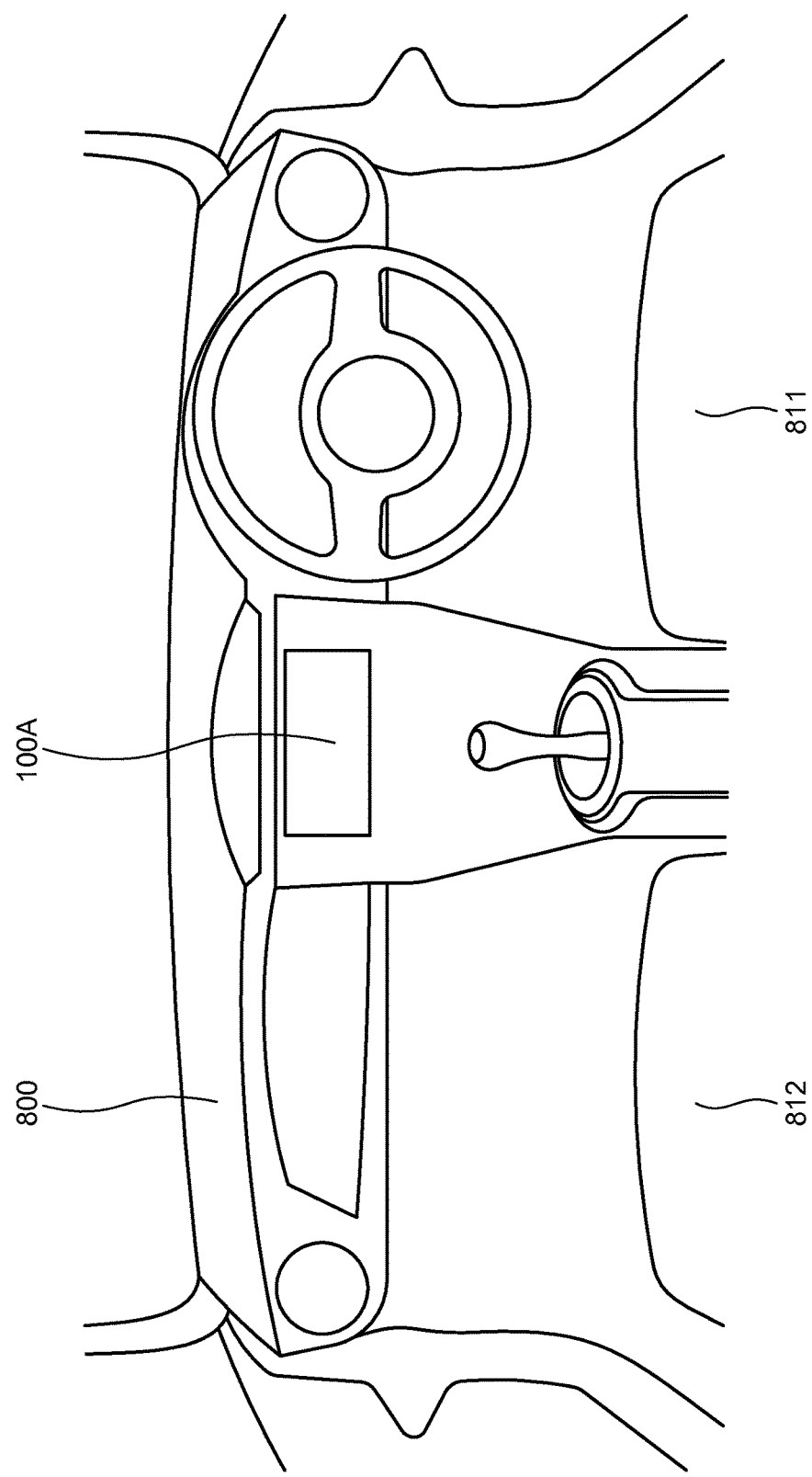
FIG. 20 is a diagram illustrating an example of an external appearance of a vehicle-mounted display device to which the liquid crystal display device according to the present invention is applied.
Figure 21:
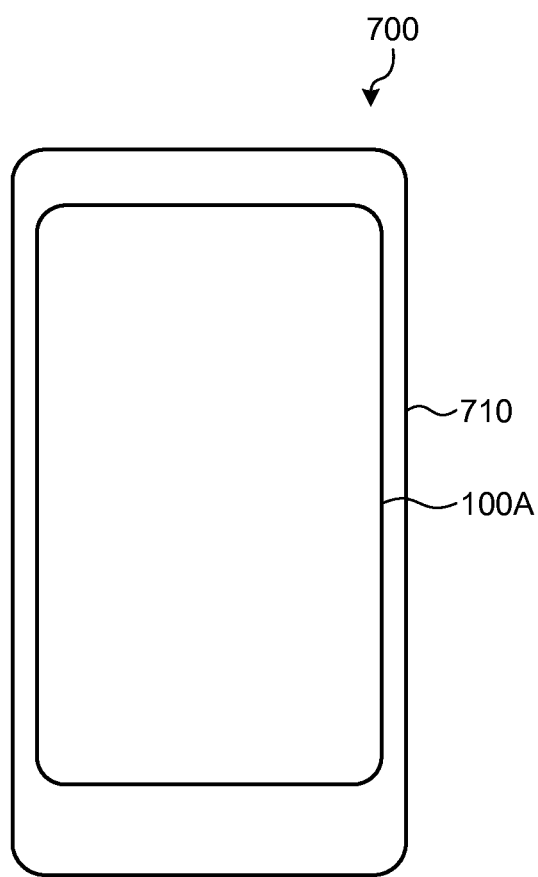
FIG. 21 is a diagram illustrating an example of an external appearance of a smartphone to which the liquid crystal display device according to the present invention is applied.

Next, the following describes application examples of the liquid crystal display device described in the above embodiments with reference to FIG. 19 to FIG. 21. The liquid crystal display device described in the above embodiments can be applied to electronic apparatuses in various fields such as a head-up display device, a vehicle-mounted display device, and a smartphone. In other words, such a liquid crystal display device can be applied to electronic apparatuses in various fields that display a video signal input from the outside or a video signal generated inside as an image or video.

Application Example 1

FIG. 19 is a schematic diagram illustrating a head-up display device (HUD) 1 to which the liquid crystal display device 100 according to the present invention is applied. The HUD 1 is mounted on a vehicle such as a car, bus, or a truck, and displays information on a projection surface, for example, a windshield of the vehicle. A driver M of the vehicle can visually recognize the information displayed on a windshield W almost without averting his/her eyes from a foreground.

The HUD 1 includes the liquid crystal display device 100 and a mirror Mi. The liquid crystal display device 100 includes a light source Li, the liquid crystal display unit 160 in which a plurality of electrodes (for example, the electrodes A to J) are arranged, and components included in the liquid crystal display device 100 that are not illustrated in FIG. 19. Examples of the light source Li include, but are not limited to, a light emitting diode (LED). The liquid crystal display unit 160 is a liquid crystal display panel, but is not limited thereto. The mirror Mi is a concave mirror for projecting an image of the liquid crystal display device 100 onto the projection surface, for example, the windshield W. The mirror Mi is not an essential component. The image of the liquid crystal display device 100 may be directly projected onto the windshield W. The image may be projected onto the windshield W via a plurality of mirrors Mi. The HUD 1 has an opening 5 at a position opposed to the windshield W and the mirror Mi.

An image P projected from the liquid crystal display unit 160 is reflected by the mirror Mi, and passes through the opening 5 to be projected onto the windshield W. The mirror Mi enlarges the image P to be projected onto the windshield W. The driver M visually recognizes, through the windshield W, a virtual image PI of the image P projected from the liquid crystal display unit 160.

The windshield W of the vehicle is irradiated with light (sunlight) LS from the sun S. The sunlight LS emitted to the windshield W passes through the opening 5 of the HUD 1 to be reflected by the mirror Mi, and is emitted to the liquid crystal display unit 160. As described above, in reflecting the image P displayed by the liquid crystal display unit 160, the mirror Mi enlarges the image P to be projected onto the windshield W. Due to this, the sunlight LS from the windshield W is contracted by the mirror Mi to be emitted to the liquid crystal display unit 160.

The temperature of the liquid crystal display unit 160 is raised by infrared rays included in the sunlight LS. The sunlight LS is condensed by the mirror Mi, so that energy density of the infrared rays emitted to the liquid crystal display unit 160 is increased. The liquid crystal display unit 160 is accommodated in a front panel IP of the vehicle, so that the liquid crystal display unit 160 is used in an environment that is easily filled with heat. Thus, the liquid crystal display unit 160 is used in an environment the temperature of which is easily raised. On the other hand, the temperature of the liquid crystal display unit 160 becomes low when it is disposed in a low-temperature environment to which the sunlight LS is not incident. The liquid crystal display device 100 is the liquid crystal display device according to the first embodiment, so that the liquid crystal display device 100 can perform operation control corresponding to the temperature of the liquid crystal display unit 160.

In the HUD 1 as described above, the sunlight LS condensed by the mirror Mi in the environment to which the sunlight LS is incident tends to be easily concentrated on the center portion of the display surface of the liquid crystal display unit 160. Accordingly, the electrodes may be arranged only at the center part in the X-direction of the display surface the temperature of which is easily increased. Alternatively, the electrodes may be arranged overall in the X-direction on the display surface, and more electrodes may be concentrated on such a portion with higher density.

Application Example 2

FIG. 20 is a diagram illustrating an example of an external appearance of a vehicle-mounted display device to which the liquid crystal display device according to the present invention is applied. The vehicle-mounted display device illustrated in FIG. 20 is a car navigation device to which the liquid crystal display device 100A according to the embodiment is applied. The liquid crystal display device 100A is installed on a dashboard 800 inside the vehicle. Specifically, for example, the liquid crystal display device 100A is installed on the dashboard 800 between a driver's seat 811 and a passenger seat 812. The liquid crystal display device 100A of the car navigation device is utilized for displaying navigation, displaying a music operation screen, or reproducing and displaying movies.

Application Example 3

FIG. 21 is a diagram illustrating an example of an external appearance of a smartphone 700 to which the liquid crystal display device 100A according to the present invention is applied. The smartphone 700 includes, for example, the liquid crystal display device 100A arranged on one surface of a housing 710 thereof.

The command from the execution unit 136 in the above embodiments is merely an example, and is not limited thereto. For example, a cooling unit may be further provided to the liquid crystal display unit 160 to be operated at the display ending temperature or a high temperature close thereto. A degree of cooling performed by the cooling unit may be changed stepwise as the temperature comes close to the display ending temperature. When the temperatures of some of a plurality of electrodes exceed the display ending temperature, display content in a display region corresponding to the some electrodes may be switched to predetermined content (for example, monochromatic display and the like). Thereafter, by maintaining the display content in this region to be the predetermined content, it is possible to suppress disturbance in the display content that may be caused when the display content is switched at a high temperature. Display can be continued by performing normal display in a display region in another portion. The backlight (for example, the backlight BL) may be enabled to be individually controlled by a unit corresponding to a specific resolution (fractionated range) of the temperature distribution using the electrode, and the execution unit 136 may be caused to output a command to designate, as a control target, only a backlight at a portion the temperature of which is equal to or higher than the display ending temperature. Regarding a portion cooled by the cooling unit, a configuration may be provided for locally cooling a portion the temperature of which is similarly increased (for example, a wind collector and a wind direction changing unit). For example, an alarming unit that gives an alarm of voice and the like may be provided to give the alarm of voice and the like when the temperatures of some or all of the electrodes exceed the display ending temperature.

The control unit 130 that functions as the specifying unit 135 and the execution unit 136 according to the embodiments performs what is called software processing in which the arithmetic unit 132 reads out the computer program from the storage unit 131 to be executed. However, this is merely an example of the specifying unit 135 and the execution unit 136, and the embodiment is not limited thereto. The control unit 130 may be hardware such as an integrated circuit including an application specific integrated circuit (ASIC), for example. Alternatively, the specifying unit 135 and the execution unit 136 may be individually arranged.

The electrodes A to J and the touch detection electrode TDL are preferably subjected to a baking process. The baking process on the electrodes further enhances heat generation efficiency of the electrodes when the voltage for heating is applied to the electrodes.

In the above embodiments, an object to which the voltage for heating is applied by the application unit 110 is the electrode used for specifying the temperature and the like (for example, the electrodes A to J or the touch detection electrode TDL), but is not limited thereto. The application unit 110 may apply the voltage for heating to the drive electrode (for example, the common electrode COML) of the liquid crystal display device to cause the drive electrode to generate heat.

In the above embodiments, the pulse signal for measurement and the pulse signal for heating are output from the same application unit 110. Alternatively, an application unit for outputting the pulse signal for measurement and an application unit for outputting the pulse signal for heating may be individually arranged.

The present invention naturally encompasses other working effects caused by the aspects described in the embodiments that are obvious from the description herein or appropriately conceivable by those skilled in the art.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display device comprising:
a liquid crystal display unit that displays an image;
a plurality of electrodes arrayed in the liquid crystal display unit in parallel with one direction along a display surface of the liquid crystal display unit;
a power line that extends in the one direction and that is commonly coupled to the electrodes;
a measuring unit that measures electric resistance values of the electrodes;
a specifying unit that specifies a temperature of the liquid crystal display unit based on the electric resistance values of the electrodes; and
an application unit that applies, to the electrodes, a voltage for causing the electrode to generate heat based on the temperature of the liquid crystal display unit, wherein
the electrodes are separated into pairs of the electrodes, including a first pair of the electrodes positioned at either end of the array of the electrodes, and a second pair of the electrodes positioned in the array of the electrodes other than both ends of the array of the electrodes, and
a distance between the power line and first end parts of the first pair of the electrodes is smaller than a distance between the power line and second end parts of the second pair of the electrodes such that an electric resistance value between the power line and the first end parts is smaller than an electric resistance value between the power line and the second end parts, and a heating value of the first pair of the electrodes is larger than a heating value of the second pair of the electrodes when the voltage for causing the electrodes to generate heat is applied.

2. The liquid crystal display device according to claim 1, further comprising:
a touch detection unit that detects proximity or contact of an object with respect to the display surface based on a change in capacitance of each of the electrodes.

3. The liquid crystal display device according to claim 2, further comprising:
a control unit that assigns an application time of a voltage applied by the application unit and a touch detecting time by the touch detection unit in a time division manner according to the temperature of the liquid crystal display unit.

4. The liquid crystal display device according to claim 2, wherein
the touch detection unit is electrically coupled to the electrode via at least one coupling part, and
the application unit is electrically coupled to the electrodes via two coupling parts including the at least one coupling part.

5. The liquid crystal display device according to claim 1, further comprising:
an operation control unit that causes the liquid crystal display unit to end display of the image when the temperature of the liquid crystal display unit is equal to or higher than a certain temperature.

* * * * *